United States Patent
Ney et al.

[11] Patent Number: 5,887,813
[45] Date of Patent: Mar. 30, 1999

[54] TAPE CASSETTE HAVING REEL DETENT PIVOTS FORMED WITH AN AXIALLY EXTENDING GROOVE FOR COOLING THE PIVOTS AT SUBSTANTIALLY THE SAME RATE AS THE CASSETTE

[75] Inventors: Theo Ney; Sadatoshi Umeki, both of Grand Duche de Luxembourg, Luxembourg; Hiroshi Kaneda, Asashina-mura, Japan

[73] Assignee: TDK Corporation, Tokyo, Japan

[21] Appl. No.: 867,999

[22] Filed: Jun. 3, 1997

[30] Foreign Application Priority Data

Jun. 11, 1996 [JP] Japan .................................. 8-170729

[51] Int. Cl.⁶ .............................. G03B 1/04; G03B 23/02
[52] U.S. Cl. .................. 242/343; 242/343.1; 242/338.1; 242/338.3
[58] Field of Search ............................... 242/343, 343.1, 242/343.2, 338.1, 338.3; 360/132

[56] References Cited

U.S. PATENT DOCUMENTS

| 3,913,145 | 10/1975 | Wigg ....................................... 360/132 |
| 4,623,105 | 11/1986 | Pertzsch et al. ....................... 242/338.3 |
| 4,964,003 | 10/1990 | Novak ................................ 242/343.2 X |
| 5,077,724 | 12/1991 | Gregg ................................... 360/132 X |
| 5,526,209 | 6/1996 | Ota ........................................... 360/132 |

FOREIGN PATENT DOCUMENTS

| 3444861A1 | 6/1986 | Germany . |
| 58-94173 | 6/1983 | Japan ..................................... 360/132 |
| 4-47811 | 11/1992 | Japan . |

Primary Examiner—Daniel P. Stodola
Assistant Examiner—Gregory J. Strimbu
Attorney, Agent, or Firm—Wood, Phillips, VanSanten, Clark & Mortimer

[57] ABSTRACT

A tape cassette consisting of two cassette halves containing a pair of tape reels around which a length of tape is wound. Columnar pivots are formed upright on an inner wall of one of the cassette halves to turnably support reel detents which keep the tape reels from turning when the tape cassette is not in use. Each of the pivots is formed with an axially extending groove for cooling the pivot at a rate substantially equal to a cooling rate of the cassette halves. Each of the grooves has a width substantially uniform throughout an axial length of the pivot.

3 Claims, 4 Drawing Sheets

TAPE CASSETTE HAVING REEL DETENT PIVOTS FORMED WITH AN AXIALLY EXTENDING GROOVE FOR COOLING THE PIVOTS AT SUBSTANTIALLY THE SAME RATE AS THE CASSETTE

BACKGROUND OF THE INVENTION

This invention relates to a tape cassette, for example, a videocassette of the VHS format, equipped with reel detents to keep tape reels inside from idly turning when the cassette is inoperative.

The housing of a conventional tape cassette such as of video tapes contains a pair of tape reels around which a length of tape is wound, and is provided with reel detents adapted to mesh with toothed peripheries of the tape reels to keep the reels from turning when not in use. The reel detents are swingably supported by pivots formed upright on the inner wall of one of two halves of the housing. When the cassette is used, a release pin of a tape recorder-reproducer (hereinafter called a tape recorder or recorder) turns the reel detents off from the braking position.

FIGS. 5 and 6 illustrate a typical arrangement of reel detents and neighboring parts in a conventional VHS videocassette. Numeral 1 designates the lower half of a cassette housing; 2, a pair of tape reels; 3, pivots for reel detents; and 4, reel detents. The peripheries of the tape reels 2 are formed with tooth-like indentations. When the cassette is not in use, pawls at the upper ends of the reel detents 4 are in mesh with the indentations to check the motion of the reels. As the cassette is pushed into a tape recorder, a release pin 6 of the recorder comes in to press a release lever 5 and turn it in the direction of the arrow. The release lever thus pushes legs 7 of the reel detents 4, causing the detents 4 to turn about the pivots and liberate the tape reels 2.

FIGS. 3 and 4 show the reel detents set free in unengaged position, FIG. 4 being a cross-sectional view taken along line 4—4 of FIG. 3. Each of the pivots 3 for the reel detents is in one piece with the lower housing half 1, formed together by molding, and upright on the bottom wall of the housing half 1.

The pivots for reel detents are required to have a sufficient diameter to maintain the strength for proper functioning. Actually, in the fabrication of cassette housings, the mold construction usually renders it difficult to efficiently expose the reel detent pivots to cooling water for solidification, making the pivots the last portions to be cooled in the molding process. Although one approach to the reduction of manufacturing cost might be "cycle speedup" (shortening of the molding cycle per piece), the approach is being questioned because it would entail deformation of the detent pivots that cool so slowly. Past endeavors to shorten the molding cycle under the existing conditions led to tilting or deformation of the pivots, thus presenting a productivity problem.

Japanese Utility Model Application Kokai No. 4-47811 proposes an attempt to speed up the cycle. It contemplates reducing the overall thickness or volume of reel detent pivots while securing the necessary diameter, and thereby increasing the cooling rate of the pivots. To be more exact, as shown in FIG. 7, an upright column of a given diameter is formed with a plurality of axially extending recesses at equal intervals circumferentially. Thus a pivot 3 of a configuration such that a plurality of ribs 8 having a predetermined thickness T are equidistantly formed radially. This construction allows the pivot to cool rapidly on molding and accordingly speeds up the cycle of molding a cassette housing.

It is true that a pivot having radial ribs as taught in Utility Model Application Kokai 4-47811 cools rapidly upon molding. However, because the portions inside the mold that form the ribs provide narrow and complex passages for molten resin, the resin flow tends to become uneven. This results in variations of rib thickness and failure to give a truly round outside diameter of the pivot. Moreover, many sharp corners formed along the outermost diametral portion of the pivot easily produce burrs, which can increase friction with the reel detent in engagement and affect its performance adversely. Further, the limited mold cavity to form the radial ribs interrupts smooth flow of molten resin, and calls for a high enough molding pressure to ensure the smooth flow at an economic disadvantage.

Therefore, the present invention aims at obtaining a tape cassette having detent lever pivots which can be solidified upon molding at the same rate as the other housing portions even when the molding cycle is cut down, with uniform resin flow ensured, the pivots as molded having fewer burrs than usual, good roundness, and sound balance.

SUMMARY OF THE INVENTION

To solve these problems, the invention provides a housing half for tape cassette which can be cooled faster than heretofore upon molding, because pivots formed upright on the inner wall of the housing half to support reel detents turnably have an axially extending groove each, and the pivots are thereby reduced in volume while maintaining a given strength without a change in the pivot diameter.

DESCRIPTION OF A PREFERRED EMBODIMENT

A preferred embodiment of the invention will now be more fully described with reference to one of the accompanying drawings.

Figure 1:
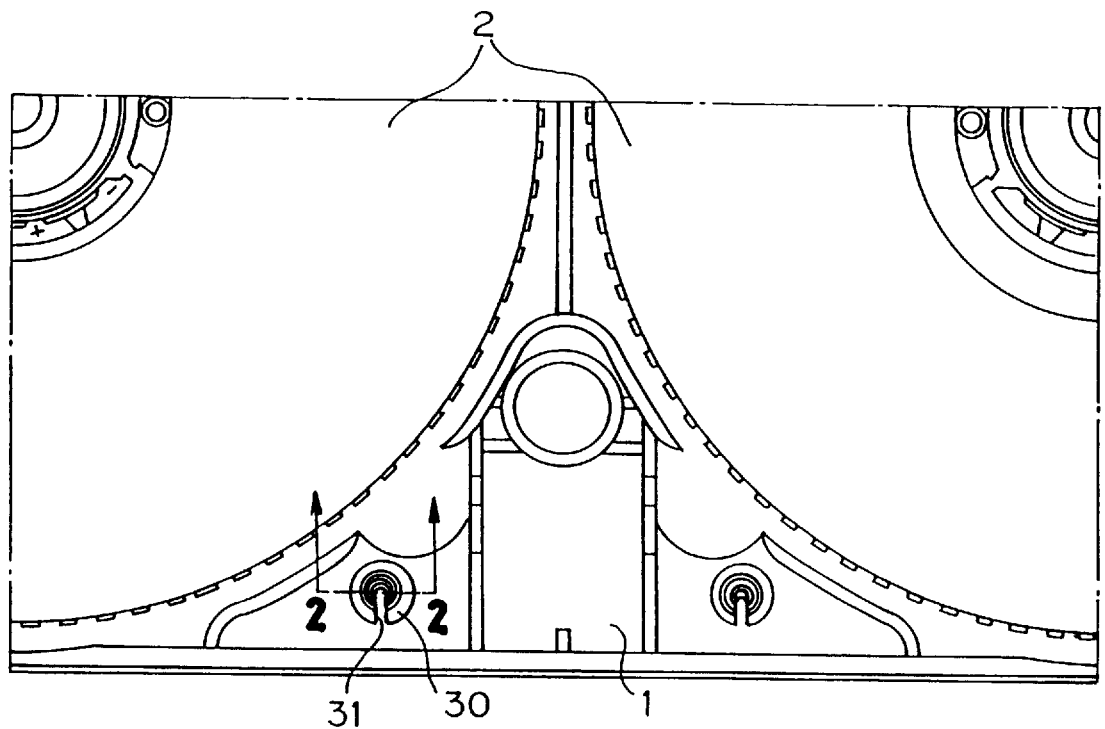
FIG. 1 is a plan view of an embodiment of the tape cassette provided with reel detent pivots according to this invention.
Figure 2:
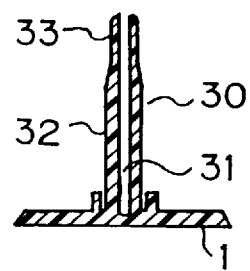
FIG. 2 is a cross-sectional view taken along line 2—2 of FIG. 1.
Figure 3:
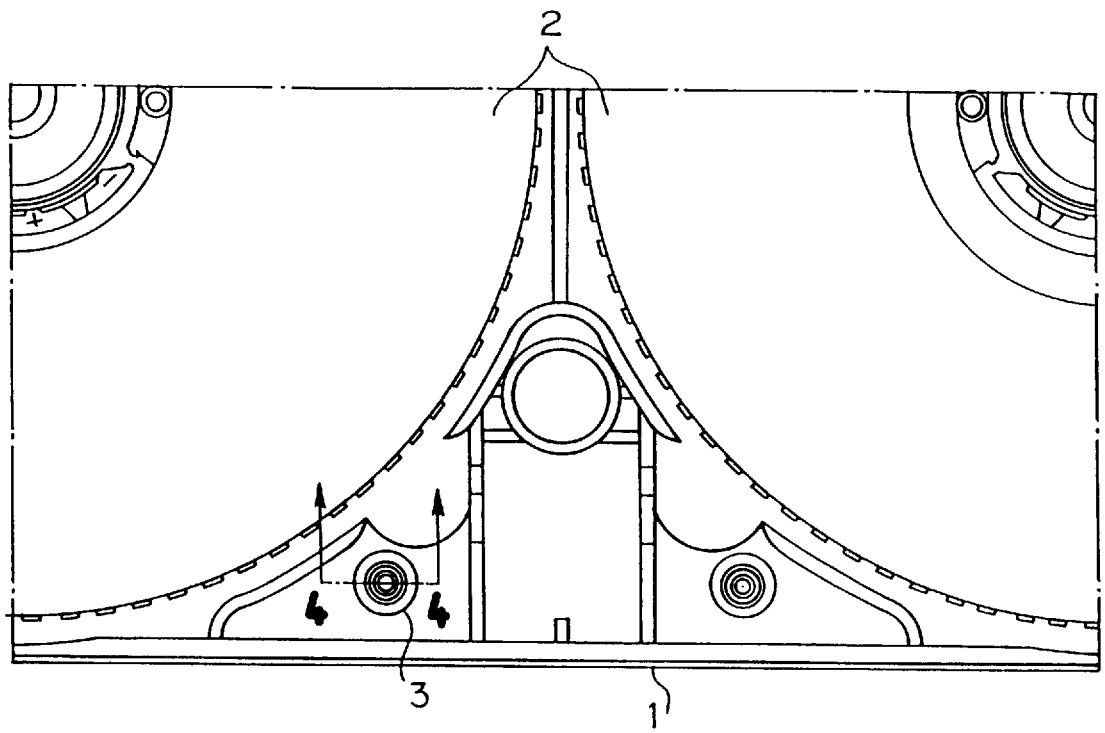
FIG. 3 is a plan view of a conventional tape cassette having reel brake pivots.
Figure 4:
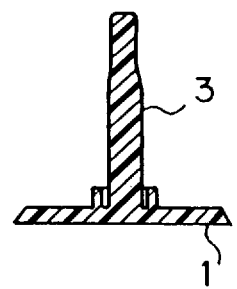
FIG. 4 is a cross-sectional view taken along line 4—4 of FIG. 3.
Figure 5:
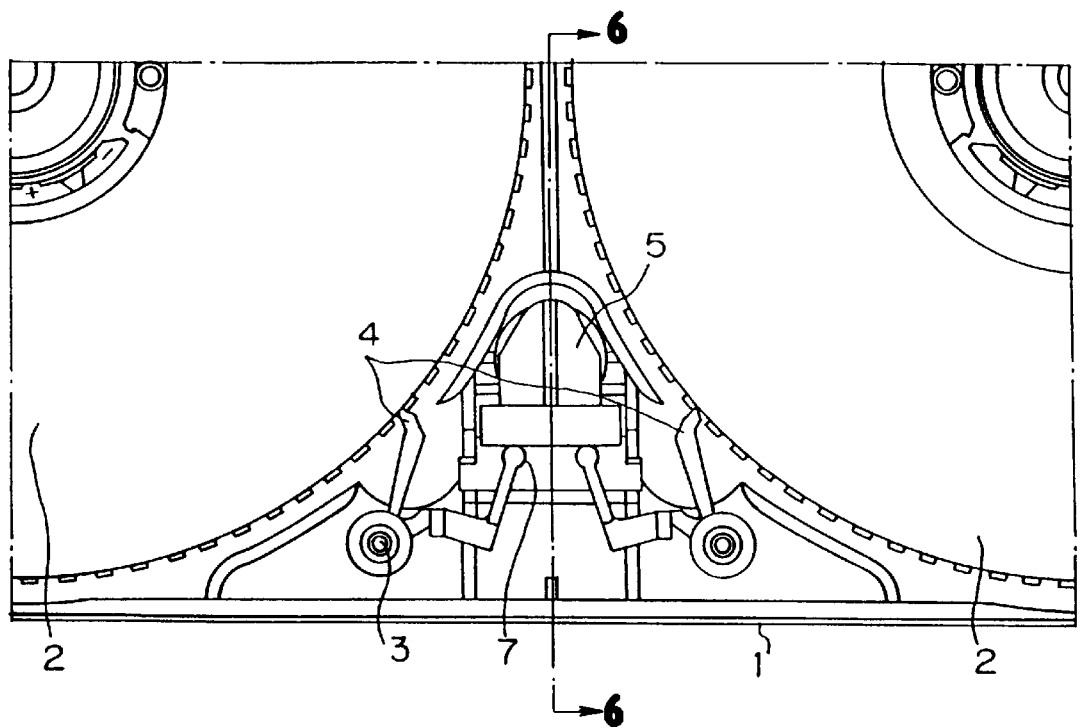
FIG. 5 is a plan view of a housing half of a conventional tape cassette provided with reel detents and release levers.
Figure 6:
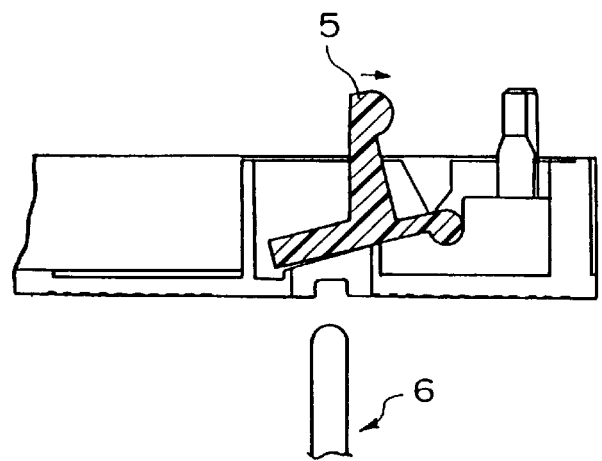
FIG. 6 is a cross-sectional view taken along line 6—6 of FIG. 5.
Figure 7:
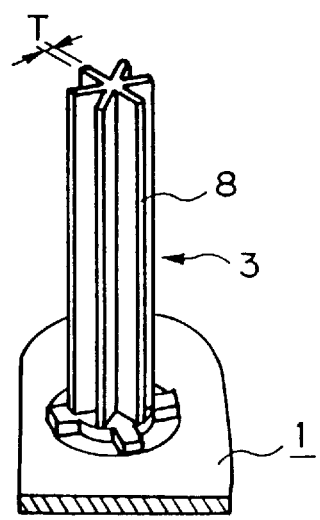
FIG. 7 is a perspective view of an example of conventional reel detent pivot.

FIG. 1 is a plan view of a lower housing half in which reel detents are not shown, and FIG. 2 is a cross-sectional view taken along line 2—2 of FIG. 1. In these views, the only part differing from the counterpart of the conventional arrangement is a reel detent pivot 30. For the rest of component parts FIGS. 3 to 6 and the description so far made in connection therewith should be referred to.

As FIGS. 1 and 2 show, the reel detent pivot 30 according to the present invention is a column formed upright on the bottom wall of a lower housing half 1, in one piece with the housing half, by injection molding of molten resin. Its lower portion 32 is a shank to support a reel detent, and its upper portion 33 is reduced in diameter to fit in a recess formed in the upper housing half (not shown). The pivot may instead have the same diameter throughout, where the design warrants. The outer surface of the pivot 30 is formed as a cylindrical one that fits in a pivot hole of a reel detent.

In conformity with the invention, a single groove 31 of substantially the same width extends axially through the pivot 30. The edges of the groove open to the outer peripheral surface of the pivot may be optionally deburred by beveling. Of the dimensions of the groove 31, the width is set to about 1 mm for the pivot diameter of about 3.6 mm, e.g., in a VHS videocassette. This would constitute a 25% cutdown of the conventional pivot volume. The reduction of pivot volume would then increase the cooling rate of the molding, resulting in a shortened molding cycle.

The groove 31 desirably is formed on the side of the pivot opposite to the side where a reel detent is pressed by a release lever.

A mold to form a pivot of the configuration described is easily made by first forming a cylindrical cavity with a groove of the same width than the groove of the resulting pivot formed axially in part of the surrounding wall of the mold and then inserting a metal strip fixedly into the cavity groove to provide the groove of the pivot.

The reel detent pivot according to this invention, which has a cylindrical outer contour, permits easy mold making with good accuracy. The single groove formed axially of the reel detent pivot enables the pivot to be cooled as fast as the rest of the cassette housing upon molding. The mold is thus well balanced in operation, contributing to the speedup of the housing molding cycle. The resulting speedup combines with a reduction of resin requirement to cut down the cost. In addition, the pivot attains improved roundness because it simplifies the molten resin flow passage and makes it uniform during the course of molding, unlike the prior art pivot provided with radial ribs. With only two sharp corners present along the circumferential surface, the pivot gets few burrs on molding and permits smooth turning of a reel detent. Moreover, unlike the radial ribs of the prior art, the groove does not interrupt the molten resin flow, and hence the pivot does not require as high a molding pressure.

What is claimed is:

1. A tape cassette containing a pair of tape reels around which a length of tape is wound and having columnar pivots formed upright on an inner wall of one of a pair of cassette halves, said pivots turnably supporting reel detents which keep the reels from rotating when said tape cassette is not in use characterized in that each of said pivots is formed with means for cooling said pivot at a rate substantially equal to a cooling rate of said cassette halves comprising an axially extending single groove having a width substantially uniform throughout an axial length of said pivot.

2. A tape cassette according to claim 1 wherein each of said pivots is formed with said groove facing away from an engagement of a respective one of said reel detents with a release lever.

3. A tape cassette according to claim 1 wherein each of said pivots has bevelled edges where said groove meets an outer circumferential surface of said pivot.

* * * * *